US007056046B2

(12) United States Patent
Yamazaki

(10) Patent No.: US 7,056,046 B2
(45) Date of Patent: Jun. 6, 2006

(54) PRINTING APPARATUS CAPABLE OF INSTALLING AN OPTIONAL UNIT FOR SUPPLYING PRINT MEDIA

(75) Inventor: Shin-ichi Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/929,527

(22) Filed: Aug. 31, 2004

(65) Prior Publication Data

US 2005/0052520 A1 Mar. 10, 2005

(30) Foreign Application Priority Data

Sep. 5, 2003 (JP) ............................ 2003-314810

(51) Int. Cl.
*B41J 11/30* (2006.01)
*G06K 15/00* (2006.01)

(52) U.S. Cl. ..................................... 400/605; 358/1.15

(58) Field of Classification Search ................ 400/605; 347/106; 358/1.13, 1.9, 1.15
See application file for complete search history.

(56) References Cited

U.S. PATENT DOCUMENTS

2003/0081235 A1 5/2003 Tanaka et al. ............ 358/1.13
2003/0081251 A1* 5/2003 Tanaka et al. ............ 358/1.15
2004/0021902 A1* 2/2004 Ogiwara et al. .......... 358/1.15
2004/0041913 A1* 3/2004 Takasumi et al. ........ 348/207.2
2005/0111015 A1* 5/2005 Tsujimoto .................. 358/1.9

FOREIGN PATENT DOCUMENTS

JP 2003-143539 5/2003

* cited by examiner

*Primary Examiner*—Andrew H. Hirshfeld
*Assistant Examiner*—Wasseem H. Hamdan
(74) *Attorney, Agent, or Firm*—Fitzpatrick, Cella, Harper & Scinto

(57) ABSTRACT

A printing apparatus that enables transmission of information between its main body and a predetermined information processing apparatus includes first and second print media supplying sections, a paper feeding unit, first and second sensors, a storage section, a determining section and a communication section. The second print media supply section stacks print media of a different size from that of the first print media supplying section. The second print media supplying section is removably installed in the first print media supplying section. The paper feeding unit is commonly used for supplying the print media stacked on both the first and section print media supplying sections. The first sensor determines whether or not the second print media supplying section is installed and the second sensor determines whether or not the second print media supplying section can supply the print media. The storage section stores media information of the print media stacked in the first and second print supplying sections. The determining section determines the print media which can be supplied in accordance with outputs of the first and second sensors. The communication section transmits the media information to the information processing apparatus after having read the media information out of the storage section, the media information corresponding to the print media determined by the determining section.

7 Claims, 9 Drawing Sheets

| | L-SIZED | 2L-SIZED | A4-SIZED | STCARD-SIZED | STANDARD |
|---|---|---|---|---|---|
| PAPER FEED TABLE 1 | ○ | × | × | ○ | ○ |
| PAPER FEED TABLE 2 | ○ | ○ | ○ | ○ | ○ |

FIG.9

PRINTING APPARATUS CAPABLE OF INSTALLING AN OPTIONAL UNIT FOR SUPPLYING PRINT MEDIA

BACKGROUND OF THE INVENTION

1. Field of the Invention

The present invention relates to a printing apparatus having a print medium supplying section that can selectively supply different types of print media to a printing apparatus main body, and in particular, to a printing apparatus that can transmit and receive information on printing to and from a predetermined information processing apparatus and a printing system having the printing apparatus and an information processing apparatus.

2. Description of the Related Art

In recent years, the quality of images provided by a printing apparatus such as a color jet printer has been improved to a level comparable to that of silver salt photography. It has thus been domestically desired to use an ink jet printing apparatus to print photograph-like high-grade images on print media of a postcard size or an L size. Such a desire tends to grow owing to the diffusion of what is called digital cameras that store still images in a storage medium.

Now, description will be given of a general operation and processing procedure used if a digital camera and an ink jet printing apparatus are connected together so as to print image data recorded in the digital camera. First, a user connects the digital camera and the ink jet printing apparatus together using a USB cable or the like to start communications. Then, the user selects one of the images displayed on a display section of the digital camera. The user also sets information on printing, for example, the type and number of print media and a layout. Finally, the user depresses a print button to transmit the selected information to the ink jet printing apparatus. The printing apparatus then starts printing on the basis of the information.

Of the series of operations, the user performs the operation of selecting information on printing including the selection of print media by selecting items from a selection table displayed on the display section of the digital camera. Plural types of selection tables are stored in the digital camera. When the digital camera and the ink jet printing apparatus are connected together, the selection table corresponding to the type of the connected ink jet printing apparatus is selected and displayed. Specifically, when the digital camera is connected to the ink jet printing apparatus, the ink jet printing apparatus transmits information such as a number and symbol (ID) representing the type of the apparatus. The digital camera selects and displays one of the stored selection tables which corresponds to the received ID information.

For example, Japanese Patent Application Laid-open No. 2003-143539 discloses a structure in which a digital camera operating as an image pickup device and a printer operating as an output device can be connected together via an interface. In this structure, data on images photographed using the digital camera is outputted to the printer and printed. The digital camera can count the number of printed sheets.

As described above, with the current printing apparatus, the user can perform operations such as the selection of print media to be printed, while viewing the contents displayed on the display section. However, with the current printing apparatus, the type of print medium specified by the user may not match the print medium supplied in the ink jet printing apparatus. Thus, operations on the printing apparatus may be complicated.

Specifically, when the ink jet printing apparatus comprises a plurality of print media stacking sections in which different types of print media can be stacked, the print media stacking sections may be removable from the printing apparatus main body. When connected to a digital camera, such an ink jet printing apparatus also transmits the ID inherent in it to the digital camera. Upon receiving the ID, the digital camera displays print media uniquely corresponding to the ID. Thus, print media in the print media stacking section which are not actually installed in the ink jet printing apparatus are displayed on the display section of the digital camera as applicable print media. Thus, the user may specify the print media not installed in the apparatus in accordance with the display. If such an operation error occurs, the ink jet printing apparatus transmits a message to the digital camera indicating that the print media are unavailable. The user must re-specify print media. Accordingly, the user may be forced to repeat such a setting operation until the media installed in the ink jet printing apparatus match the print media specified by the user. This disadvantageously makes the user's setting operations complicated and degrades the reliability of the apparatus.

Further, there maybe a plurality of print media stacking sections in which different types of print media are stacked so as to switch the print media stacking sections from one to another. For example, if the ink jet printing apparatus comprises a print media stacking section in which ordinary paper is stacked and a print media stacking section in which print media allowing the formation of photograph-like images are stacked, printing may be executed while frequently switching the print media stacking sections from one to the other. However, even if the available print media are switched in the ink jet printing apparatus, this is not reflected in the digital camera. Thus, the user must specify print media from applied print media displayed uniquely on the basis of the ID as previously described. Accordingly, the user must perform a printing operation while memorizing the type of print media selected in the ink jet printing apparatus. This cumbersome printing operation may cause the user to make mistakes in operations. In particular, if different users perform printing operations, the users may not be able to achieve appropriate printing operations unless they confirm the switching state in the ink jet printing apparatus. This degrades the operability of the ink jet printing apparatus.

The present invention is provided to solve these problems. It is an object of the present invention to provide a printing apparatus comprising a print media supplying section that selectively supplies plural types of print media and having a high operability, wherein a user can reliably specify applicable print media on an information processing apparatus by transmitting information on print media that can be actually supplied in the printing apparatus, to the information processing apparatus and wherein even if the applied print media are switched in the printing apparatus, the user can reliably recognize this on the information processing apparatus.

SUMMARY OF THE INVENTION

To solve the above problems, the present invention has a configuration described below.

A first aspect of the present invention provides a printing apparatus that enables transmission of information between a printing apparatus main body that performs a printing operation on print media and a predetermined information processing apparatus, characterized by comprising print media supplying sections that can selectively supply different types of print media to the printing apparatus main body, storage means in which media information on plural types of print media are stored, determining means for determining print media that can be supplied by the print media supplying section, and the communication means reads media information corresponding to the print media which can be supplied and which has been determined by the determining means and transmits the media information to the information processing apparatus.

A second aspect of the present invention provides a printing system comprising a printing apparatus including a printing apparatus main body that performs a printing operation on print media and an information processing apparatus having predetermined information processing means, input means, and display means, the printing system enabling transmission of information between the printing apparatus and the information processing apparatus, characterized in that the printing apparatus comprises print media supplying sections that can selectively supply different types of print media to the printing apparatus main body, storage means in which media information on plural types of print media are stored, determining means for determining print media that can be supplied by the print media supplying section, and communication means for reading, from the storage means, the media information corresponding to the print media determined by the determining means and transmitting the media information to the information processing apparatus, in that the information processing apparatus comprises display means for displaying printable print media on the basis of information transmitted by the printing apparatus main body via the main body transmitting means and processing apparatus transmitting means for transmitting print media specifying information specifying print media to be used, to the printing apparatus main body, and in that the printing apparatus receives the print media specification information transmitted by the processing apparatus transmitting means to supply, on the basis of the information, print media from one of the plurality of print media stacking sections in which the specified print media can be stacked.

According to the present invention configured as described above, if the print media in one of the print media supplying sections, which supply different types of print media, cannot be supplied or print media to be supplied are frequently changed, the printing apparatus transmits information on print media that can be supplied to the information processing apparatus. Thus, the user can always reliably set, from the information processing side, print media that can be supplied for the printing apparatus main body. This significantly improves the operability and reliability of the apparatus. It is also possible to prevent useless printing on undesired print media, thus reducing running costs.

The above and other objects, effects, features and advantages of the present invention will become more apparent from the following description of embodiments thereof taken in conjunction with the accompanying drawings.

BRIEF DESCRIPTION OF THE DRAWINGS

FIG. 7 is a flow chart showing a process flow executed in a printing system according to the embodiment of the present invention in connection with initialization upon power-on;

FIG. 9 is a diagram showing an example of a print media table according to the embodiment of the present invention.

DETAILED DESCRIPTION OF PREFERRED EMBODIMENTS

A preferred embodiment of the present invention will be described below in detail with reference to the drawings. The printing apparatus according to this embodiment is an ink jet printing apparatus that forms an image on a print medium by ejecting inks to the print medium. As is well known, the ink jet printing apparatus can be a serial printer type or a full line type. The serial printer type ink jet printing apparatus forms a predetermined image by ejecting inks from a print head while moving a carriage, on which the print head is mounted, in a main scanning direction (in FIGS. 1 and 2, an X direction) to perform a printing operation, and in union with the main scanning by the print head, intermittently conveying a print medium by a predetermined amount in a direction crossing the main scanning direction (in FIGS. 1 and 2, a Y direction orthogonal to the main scanning direction). The full line type ink jet printing apparatus forms a predetermined image by fixing print heads at specified positions, the print heads being arranged in a line so that their arrangement width is more than the maximum width of a print medium, and ejecting inks from the print heads while moving the print medium in the direction crossing (normally, orthogonal to) the print heads.

The present embodiment employs the serial printer type ink jet printing apparatus. However, the present invention is not limited to this aspect but is applicable to the full line type ink jet printing apparatus. Further, the present invention is not limited to what is called a non-impact type printing apparatus such as the ink jet printing apparatus in which a print medium does not contact directly with the print head. The present invention is also applicable to what is called an impact type printing apparatus in which the print medium contacts with the print head.

Figure 1:
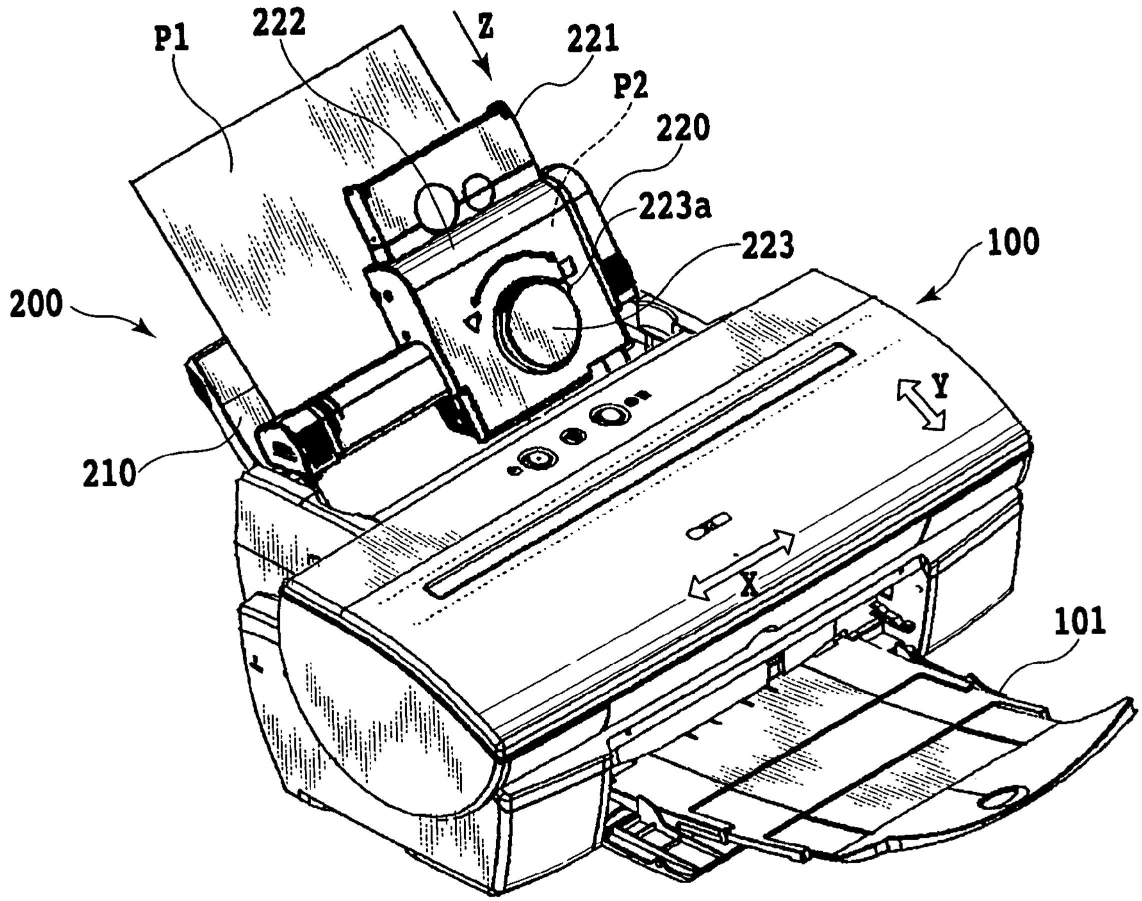
FIG. 1 is a perspective view showing the whole configuration of an ink jet printing apparatus according to an embodiment of the present invention, wherein a paper supply from a sub paper feeding tray is stopped.

FIG. 1 is a perspective view showing the whole configuration of the ink jet printing apparatus according to the embodiment.

In FIG. 1, the ink jet printing apparatus comprises a carriage on which a print head is mounted, a printing section (not shown) including at least a carriage moving mechanism that moves the carriage in the main scanning direction (X direction), a printing apparatus main body 100 comprising at least a conveying mechanism (not shown) that conveys a print medium in a sub-scanning direction (Y direction) orthogonal to the main scanning direction, and a print media supplying section 200 that supplies print media to the printing medium main body, as described above. The printing apparatus main body 100 is provided with a paper discharge tray 101 at a front surface which can be opened and closed and which holds print media printed by the print head and fed out by the conveying mechanism.

The print media supplying section 200 is installed on a rear surface of the printing apparatus main body 100. The print media supplying section 200 mainly comprises a main paper feeding tray (first print media stacking section) 210 in which print media are stacked, a sub paper feeding unit 220 having a sub paper feeding tray (second print media stacking section) 221, and a paper feeding mechanism 230 (see FIG. 6) that selectively supplies print media from the paper feeding tray 210 or 221.

Now, with reference to FIGS. 1 to 6, a detailed description will be given of the configuration and operation of each section.

The first paper feeding tray 210 projects rearward and upward so that a bundle of a predetermined number of print media are stacked. The first paper feeding tray 210 is suitable for stacking print media such as ordinary paper, which are relatively large, for example, A4- or B5-sized, and which are used to create documents. FIG. 1 shows how print media are stacked in the tray. However, the print media that can be stacked in the first paper feeding tray 211 are not limited to ordinary paper. Larger print media for photographs can be stacked in the tray. A paper feeding roller 231 provided in the paper feeding mechanism 230 separates each of the print media P1 stacked in the first paper feeding tray 211 from the others and feeds the print medium P1 to the printing section in a Z direction. The paper feeding roller 231 is rotated by transmitting the driving force of a supply motor 233 shown in FIG. 6 to the roller 231 via a gear train 232.

At the front surface of the first paper feeding tray 210, the sub paper feeding unit 220, holding the sub paper feeding tray 221, is removably installed in the print media supplying section 200. A plurality of relatively small L-sized print media or print media which are as large as postcards and on which photograph-like images are printed (these print media will hereinafter referred to as photographing print media) can be housed in the sub paper feeding tray 221. The sub paper feeding tray 221 is provided with a tray cover 222 which can be opened and closed and which protects housed print sheets from dust and external light. To house print media in the sub paper feeding tray 221, the user can open the tray cover 109 as shown in FIG. 1 and stack the print media for photographs in the tray 221.

The second paper feeding tray 221 is placed in front of and parallel to the first paper feeding tray 210. Furthermore, an appropriate gap is created between the sub paper feeding unit 220 and the first paper feeding tray 221.

Thus, about 100 sheets of ordinary paper can be stacked in the first paper feeding tray 210. A paper type sensor 104 contacts with a front surface of the uppermost print medium at a moderate pressure. Before being fed to the position (printing section) where a printing operation is performed by the print head, the print medium P1 has its surface state optically detected and identified. Control means realizes an appropriate printing operation form on the basis of the result of the identification.

Figure 2:
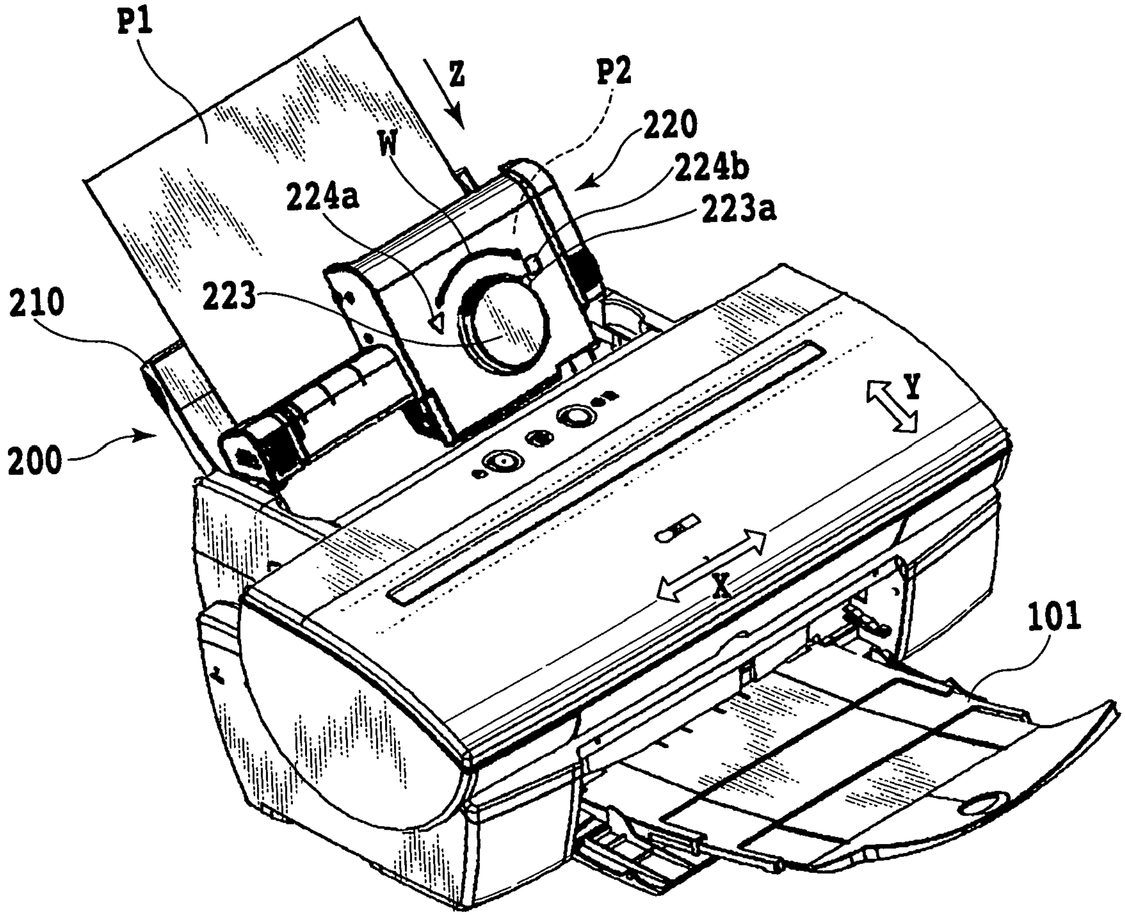
FIG. 2 is a perspective view showing the whole configuration of the ink jet printing apparatus according to the embodiment of the present invention, wherein a paper supply from a sub paper feeding tray is enabled.
Figure 3:
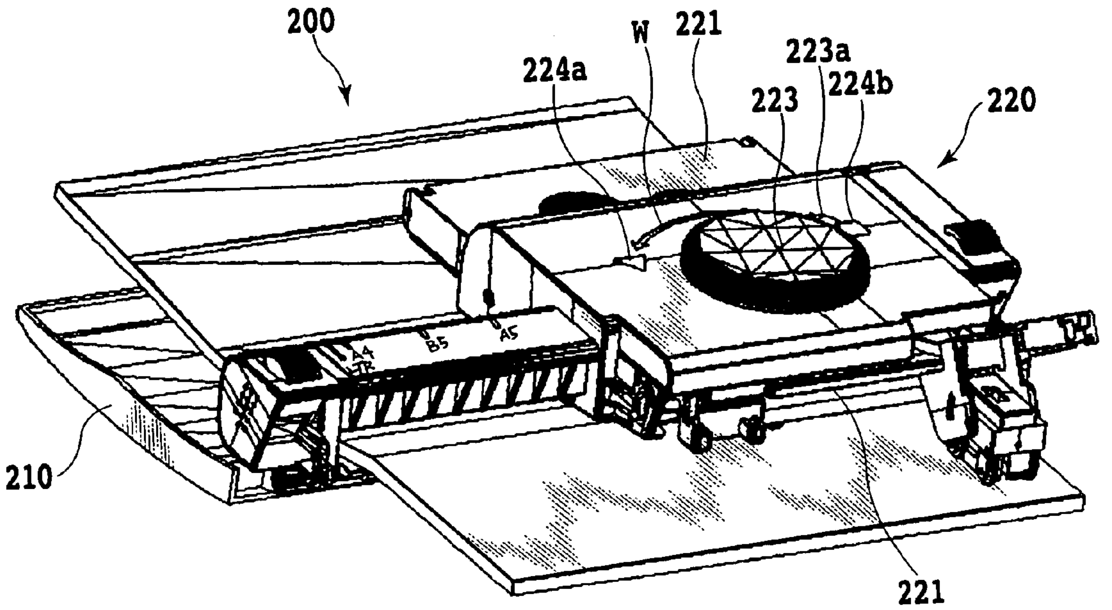
FIG. 3 is a perspective view of the sub paper feeding tray according to the embodiment of the present invention in its paper feed stopped state.
Figure 4:
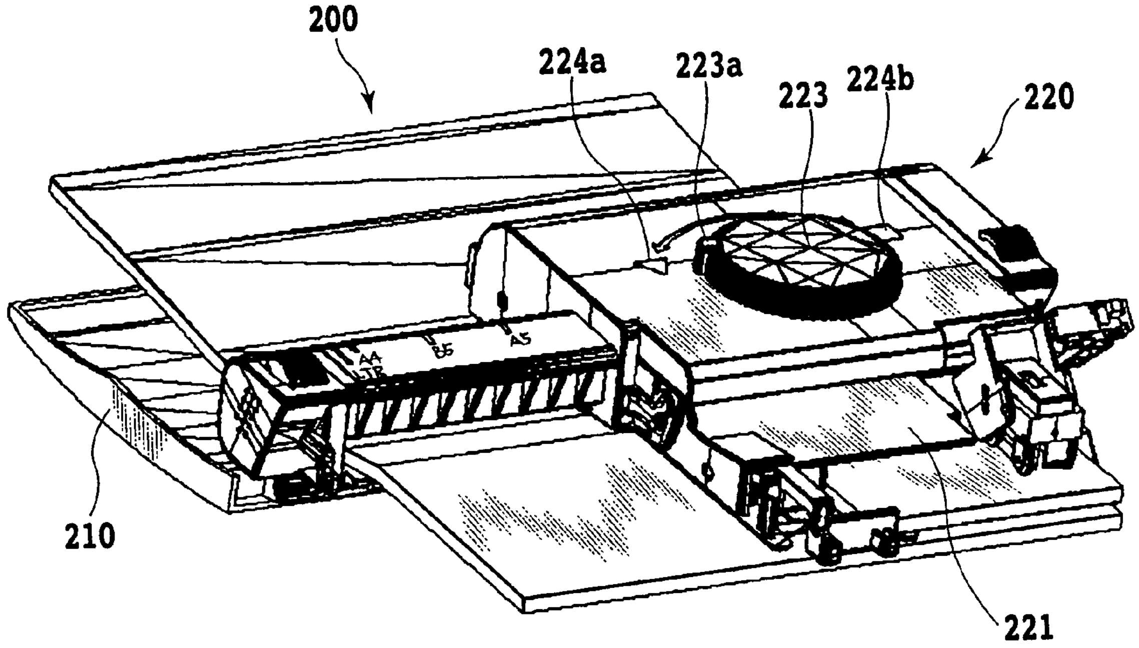
FIG. 4 is a perspective view of the sub paper feeding tray according to the embodiment of the present invention in its paper feed enabled state.
Figure 5:
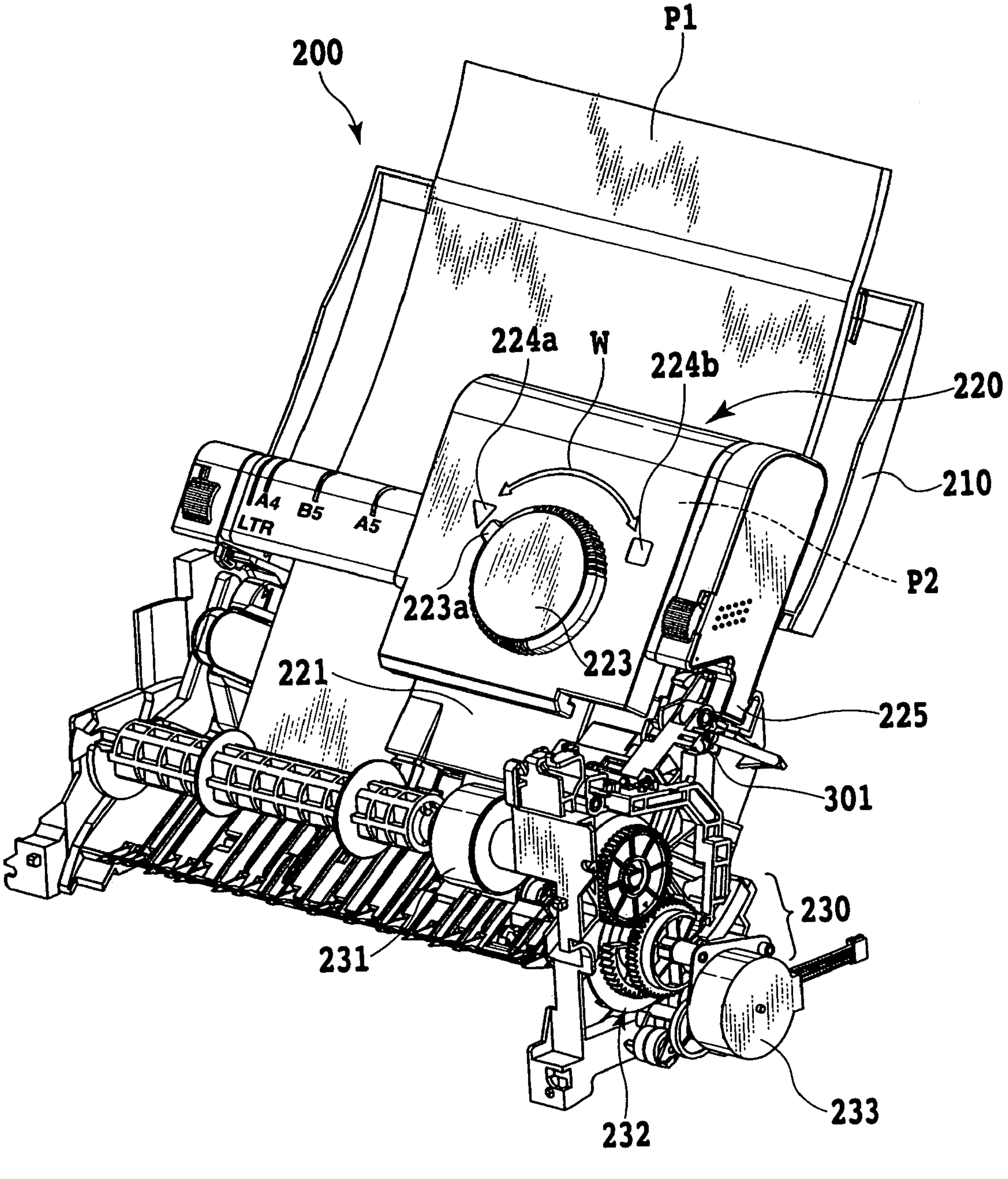
FIG. 5 is a perspective view showing the whole configuration of a sheet feeding section according to the embodiment of the present invention.

A rotating knob 223 is provided on a front surface of the sub paper feeding unit 220. A pointer portion 223*a* is projected from a certain position on an outer peripheral portion of the rotating knob 223. The rotating knob 223 is rotated clockwise and counterclockwise between two set positions 224*a* and 224*b* as shown by the arrow in the figure. When the rotating knob 223 is set in the set position 224*a*, the sub paper feeding tray 221 is held in an elevated position as shown in FIG. 1. When the rotating knob 223 is set in the set position 223*b*, the sub paper feeding tray 221 is held in a lowered position as shown in FIG. 2. When the sub paper feeding tray 221 is in the elevated position, print media P2 stacked in the sub paper feeding tray 221 are not fed to the printing apparatus main body 100 (stopped state). When the sub paper feeding tray 221 is in the lowered position, the print media P2 can be fed to the printing apparatus main body 100 (enabled state). A switching mechanism is composed of the rotating knob and a mechanism that elevates and lowers the sub paper feeding tray 221 in unison with the rotating knob.

A tray state detecting sensor 301 is disposed in the paper feeding section 200. The tray state detecting sensor 301 detects whether the sub paper feeding tray 221 is stopped (elevated position) or enabled (lowered position).

Specifically, only when the pointer portion 223*a* of the rotating knob 223 is set in the set position 224*b*, a well-known link mechanism operating in unison with operations of the sub paper feeding unit 220 is used to project a lever member (not shown) from a bottom surface of the sub paper feeding unit 220. The tray state detecting sensor 301, provided in the paper feeding section (print media supplying section) 200, detects the projecting lever member. The tray state detecting sensor 301 may be an optical interrupter or mechanical sensor having an electric contact portion that mechanically contacts with and separates from the tray.

If the sub paper feeding unit 220 is installed in the paper feeding section 200, it is possible to detect whether or not the sub paper feeding tray 221 is in the enabled state, on the basis of a signal from the tray state detecting sensor 301.

The stopped state in which a paper supply from the sub paper feeding unit 220 is stopped includes not only the state in which the pointer portion 223*a* of the rotating knob 223 is set in the set position 224*b* while the sub paper feeding unit 220 is installed in the paper feeding section 200 but also the state in which the sub paper feeding unit 220 is not installed in the paper feeding section 200. The latter stopped state can also be detected on the basis of a signal from the tray state detecting sensor 301. Further, the sub paper feeding unit 220 has no electric contacts or parts and thus need not be provided with, for example, wiring required to transmit electric signals. As a result, durable mechanisms are realized.

Figure 6:
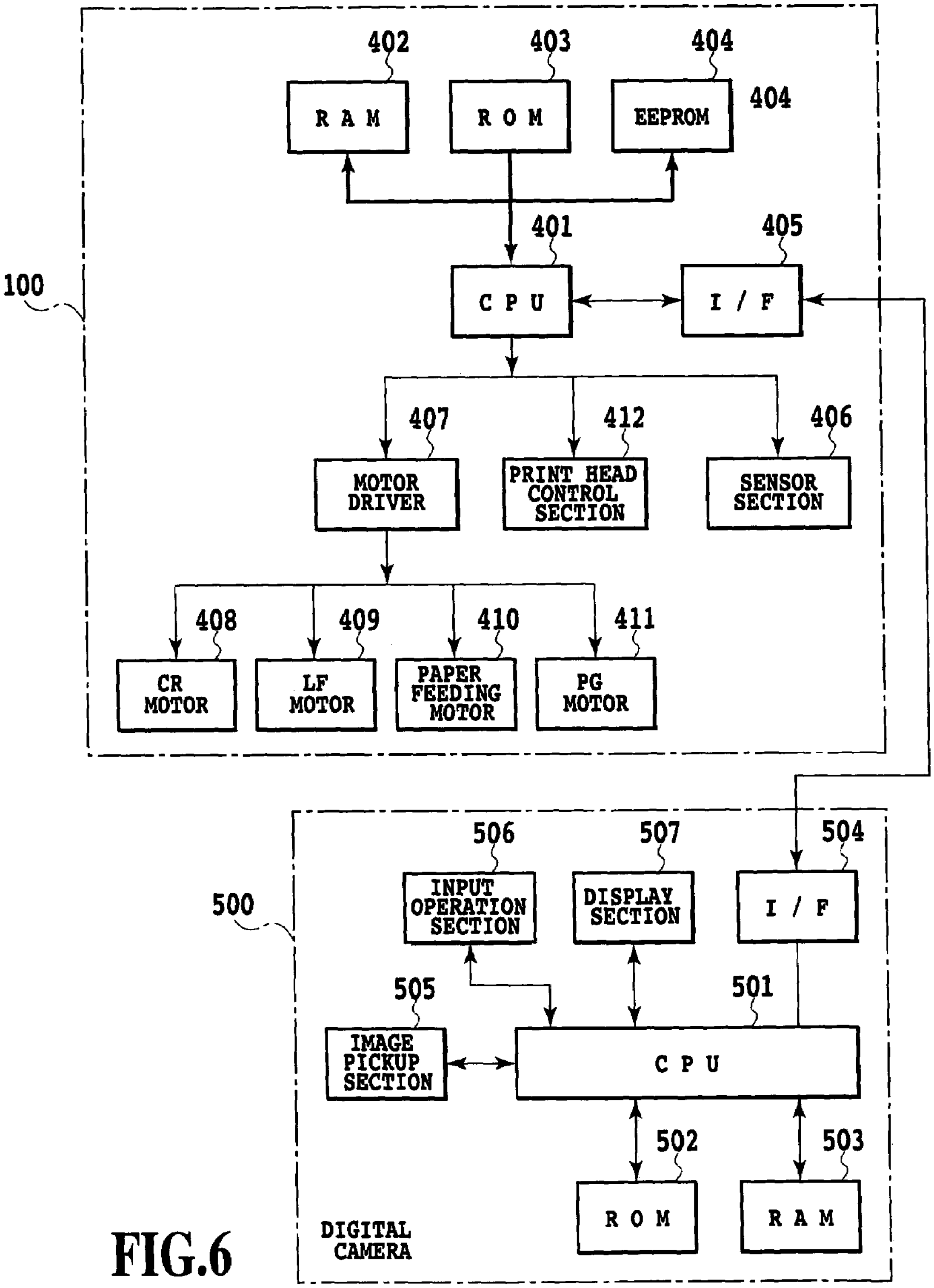
FIG. 6 is a block diagram of a control system according to the embodiment of the present invention.

FIG. 6 is a block diagram showing the configuration of the ink jet printing apparatus according to the present embodiment.

In FIG. 6, reference numeral 401 denotes a CPU that executes various calculating and determining processes and controls the sections described later. For example, the CPU creates print data for the ink jet printing apparatus, drives a motor to control printing, controls ejections from the print head, analyzes commands transferred by an information processing apparatus such as a digital camera or a personal computer which is connected to the ink jet printing apparatus, and performs various control operations on the basis of inputs from a panel.

Reference numeral 402 denotes a RAM used by a control program, and reference numeral 403 denotes a ROM in which a control program for the ink jet printing apparatus is stored. The ROM also stores software that controls the ink jet printing apparatus, and various data. The control device for the ink jet printing apparatus includes a process of informing the information processing apparatus (for example, a digital camera 500) of print media corresponding to the result of detection by the tray state detecting sensor 301. The control software in the ROM 403 is executed as a program read by the CPU 401. Some of the data are directly used as initial values, and others are expanded into the RAM 402 and processed by the CPU 401.

Reference numeral 404 denotes an EEPROM to which information for the ink jet printing apparatus is saved. The EEPROM stores not only the set conditions of the ink jet printing apparatus but also the number of sheets printed, the amount of ink remaining, and the like. Stored information on the set conditions of the ink jet printing apparatus includes function items such as an automatic power-on/off and a dry mode.

Reference numeral 405 denotes an interface (I/F) operating as communication means to receive print data from the higher information processing apparatus. The received print data is loaded into the CPU 401 and expanded onto the RAM 402 as image data. The I/F 405 can use IEEE1284, IEEE1394, USB, radio, or the like to bidirectionally communicate with the information processing apparatus.

Reference numeral 406 denotes a sensor section including various sensors such as the tray state detecting sensor 301, a print media detecting sensor that detects whether or not a print medium is present in a conveying path in the printing apparatus main body 100, and a temperature sensor that detects the ambient temperature, the temperature of the print head, and the like.

Reference numeral 408 denotes a carriage (CR) motor used as a driving source for scanning the carriage on which the print head is mounted, in the main scanning direction. Reference numeral 409 denotes a line feed (LF) motor used as a driving source for intermittently moving a print medium in the sub-scanning direction.

Reference numeral 233 denotes an auto sheet feed (ASF) motor used as a driving source for separating each of the print media in the paper feeding tray 221 or 210 of the paper feeding section 200 from the others and feeds the print medium P1 to a printable position. Reference numeral 411 denotes a purge (PG) motor used as a driving source for recovering the print head. Reference numeral 406 denotes a motor driver that drives each motor; each motor can be independently operated. Reference numeral 412 denotes a print head control section that controls ejections from the print head.

Reference numeral 500 denotes a digital camera operating as information processing means connected to the ink jet printing apparatus. In the digital camera 500, reference numeral 501 denotes a CPU, and reference numeral 502 denotes a ROM in which a control program and the like are stored. Reference numeral 503 denotes a RAM which functions as a work area for process operations performed by the CPU 501 and which stores various data. The CPU 501 connects to an image pickup section 505 that converts optical images incident via an optical system into electric image signals, a display section 507 that displays various images including inputted images and print media tables, described later, an input operation section 506 that gives instructions and inputs various data to the image pickup section or ink jet printing apparatus, and an interface (I/F) operating as communication means for transmitting and receiving information to and from the ink jet printing apparatus. The digital camera 500 and the ink jet printing apparatus constitute a printing system that enables transmissions of information between them.

Now, description will be given of a process flow of a printing system composed of the ink jet printing apparatus configured as described above and the digital camera 500.

Figure 7:
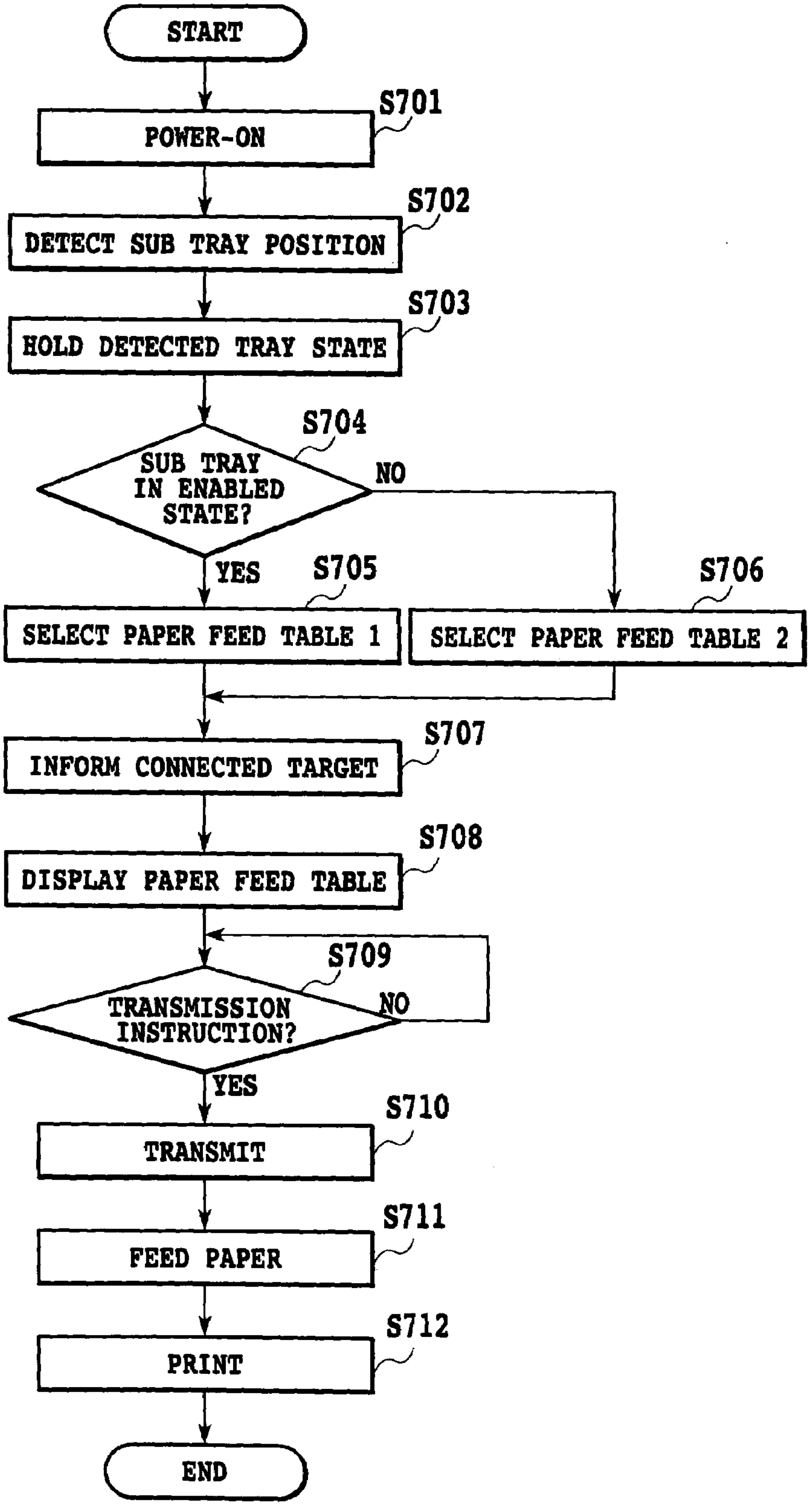

First, with reference to FIG. 7, description will be given of a process flow executed in the printing system in connection with initialization upon power-on.

The printing system is powered on (step S701). The tray state detecting sensor 301, provided in the paper feeding section 200, detects whether or not the sub paper feeding tray 221 can supply print media (step S702). Then, a flag is set depending on the result of the detection. This is carried out to detect whether or not the sub paper feeding tray 221 has been switched from the enabled state to the stopped state or vice versa in the process operation in FIG. 8. Subsequently, on the basis of the state of the sub paper feeding tray 222 detected in the step S702, the following process is executed in accordance with the flow from steps S704 to S707, described below: information indicative of the type of print media that can be supplied to the printing section of the printing apparatus main body 100 is transmitted to the digital camera 500, that is, the information processing apparatus connected to the printing apparatus.

First, it is determined whether the current sub paper feeding tray 211 is in the enabled state or the stopped state (step S704). If the current sub paper feeding tray 211 is determined to be in the enabled state, a paper feed table 2 is selected as communication information transmitted to the digital camera 500 (step S706). The paper feed table 2 is then transmitted as paper feed information (step S707). The enabled state means that the sub paper feeding tray 221 is set in the lowered position by setting the rotating knob 223 of the sub paper feeding unit 220.

If it is determined in the step S704 that the current sub paper feeding tray is in the stopped state, a paper feed table 1 is selected (step S705). The paper feed table 1 is then transmitted to the digital camera 500 as communication information. The sub paper feeding tray may be determined to be in the stopped state if the rotating knob 223 is operated to place the sub paper feeding unit 220 in the elevated position and if the sub paper feeding unit 200 is not installed in the paper feeding section 200. However, in either case, the paper feed table 1 is transmitted to the digital camera 500 as communication information (step S707).

Subsequently, upon receiving the paper feed table information transmitted by the ink jet printing apparatus, the CPU 501 in the digital camera 500 allows the display section 507 to display the paper feed table (S708).

FIG. 9 shows an example of the paper feed tables 1 and 2 relating to the print media displayed by the digital camera 500.

As shown in the figure, the paper feed table 1 is used when a paper feed from the sub paper feeding tray 221 is enabled. The paper feed table 1 thus indicates that large-sized paper such as 2L- and A4-sized sheets cannot be printed. On the other hand, the paper feed table 2 is used when a paper feed from the sub paper feeding tray 221 is stopped, while only a paper feed from the main paper feeding tray 210 is enabled. The paper feed table 2 thus indicates that relatively large-sized paper such as A4- and 2L-sized sheets can also be fed.

The display section 507 thus displays tables such as those described above, so that the user can reliably recognize the sizes and materials of print media that can be printed by the ink jet printing apparatus. Then, the user specifies, for example, the type of print media to be used, in accordance with the paper feed tables. The user thus determines images to be printed. Subsequently, the user depresses a transmission button in the input operation section 506 to transmit information on the determined print media and image data from the ink jet printing apparatus (steps S709 to S710). Subsequently, on the basis of the data transmitted from the digital camera 500, the ink jet printing apparatus selects the paper feeding tray in which the selected print media are stacked. The ink jet printing apparatus then performs a printing operation by feeding paper from the selected paper feeding tray (steps 5711 and S712).

Figure 8:
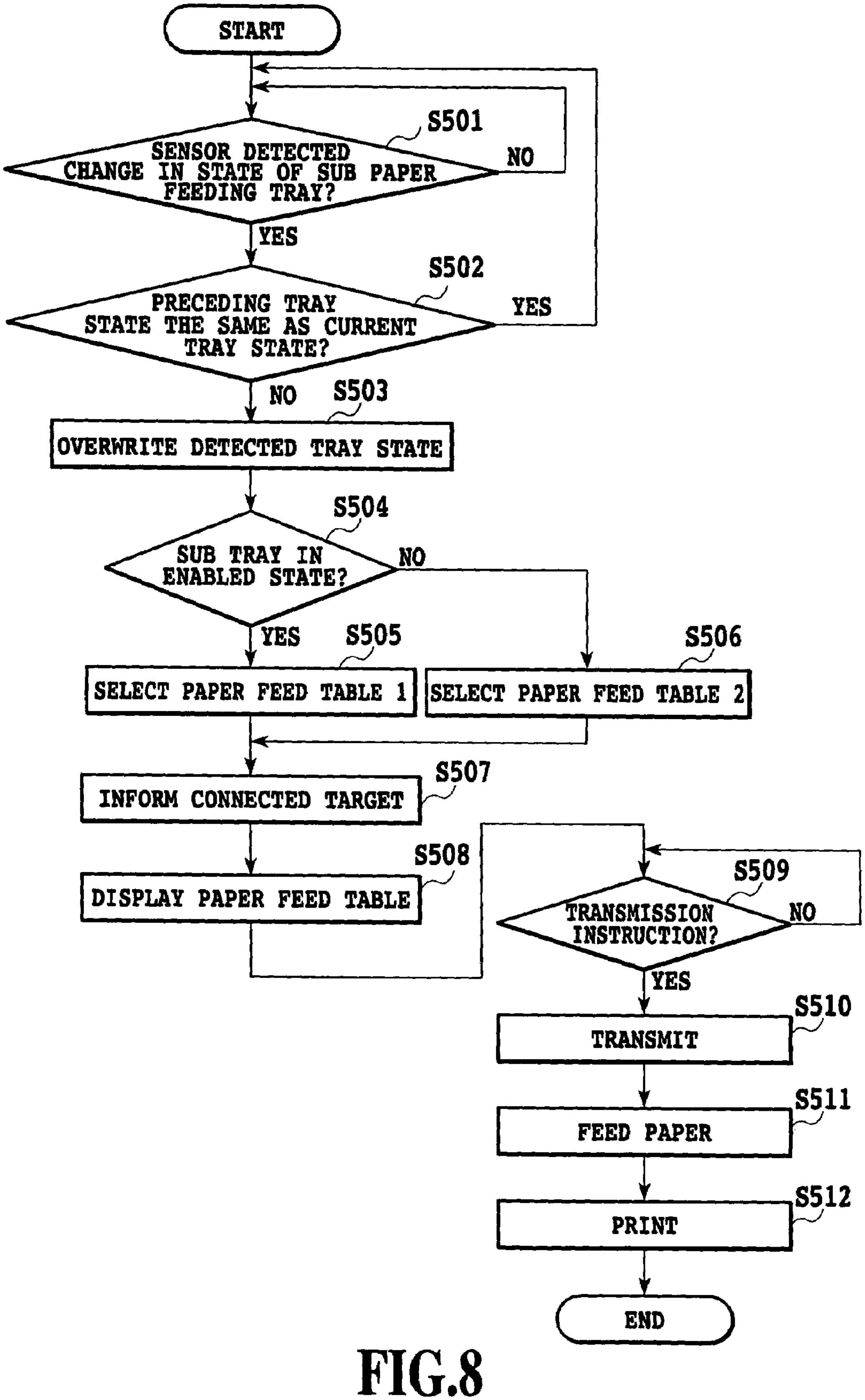
FIG. 8 is a flow chart showing a process flow executed in the printing system according to the embodiment of the present invention if a user changes a paper feeding tray from which paper can be fed.

Now, with reference to FIG. 8, description will be given of a process flow executed if the user changes the paper feeding tray from which paper can be fed.

It is determined whether the state of the sub paper feeding tray 221 of the paper feeding section 200 has been changed, that is, the sub paper feeding tray has been changed from the enabled state to the stopped state or vice versa. This can be detected on the basis of the result of detection by the tray state detecting sensor 301 (step S501). Then, it is determined whether or not the result of the detection by the tray state detecting sensor 301 is the same as the result of the preceding detection (step S502). For example, immediately after the previously described initialization, the result of detection stored in the step S702 is compared with the result of the current detection. If it is determined in the step S502 that the results of the preceding and current detections are the same, it is then determined that the state of the sub paper feeding tray 221 has not been changed. The information based on the result of the detection is not transmitted to the digital camera 500 connected to the printing apparatus. On the other hand, if the results of the preceding and current detections are different, it is then determined that the state of the sub paper feeding tray 221 has been changed. Thus, the result of the current detection is written over the result of the detection set during the preceding detecting operation (step S503).

Subsequently, on the basis of the state of the sub paper feeding tray 221 detected in a step S504, the following process is executed in accordance with the flow from steps S504 to S507: information indicative of the type of print media that can be supplied to the printing section of the printing apparatus main body 100 is transmitted to the digital camera 500, the information processing apparatus connected to the printing apparatus.

First, it is determined whether the current sub paper feeding tray 211 is in the enabled state or the stopped state (step S504). If the current sub paper feeding tray 211 is determined to be in the enabled state, the paper feed table 2 is selected as communication information transmitted to the digital camera 500 (step S506). The paper feed table 2 is then transmitted as paper feed information (step S507). The enabled state means that the sub paper feeding tray 221 is set in its lowered position by setting the rotating knob 223 of the sub paper feeding unit 220.

If it is determined in the step S504 that the current sub paper feeding tray is in the stopped state, the paper feed table 1 is selected (step S505). The paper feed table 1 is then transmitted to the digital camera 500 as communication information. The sub paper feeding tray may be determined to be in the stopped state if the rotating knob 223 is operated to place the sub paper feeding unit 220 in the elevated position and if the sub paper feeding unit 200 is not installed in the paper feeding section 200. However, in either case, the paper feed table 1 is transmitted to the digital camera 500 as communication information (step S507).

After the transmission to the digital camera, operations similar to those in the steps S708 to S712 are performed in the digital camera 500 and the ink jet printing apparatus in step S508 to S512.

In FIG. 9, the tables show only the sizes of print media. However, other tables such as a table indicating quality of print media or a parameter table relating to image correction may be employed in accordance with the conditions whether or not the sub-paper feeding tray 221 is installed, with such employment information being sent to the information processing apparatus.

In the above embodiment, the digital camera has been exemplified as the information processing apparatus to be connected to the ink jet printing apparatus. However, any information processing apparatus capable of communicating with the ink jet printing apparatus is applicable. In other words, such information processing apparatus requires information processing means, display means, and the like. The present invention is not limited to the ink jet printing apparatus employing the digital camera as the information processing apparatus.

Further, in the above description of the embodiment, an example of the print media stacking means is the ink jet printing apparatus having the two paper feeding trays, the main paper feeding tray and the sub paper feeding tray. However, the present invention is applicable to an ink jet printing apparatus having three or more print media stacking means. Further, the plurality of print media stacking means may be removable from or fixed to the printing apparatus main body. Moreover, each print media stacking means may have a function to be appropriately switched between the enabled state and the stopped state. However, the present invention is applicable to the case where the print media stacking means is not provided with such a switching function. That is, even if the print media stacking means is not provided with a function to switch between the enabled state and the stopped state, if the print media stacking means is removable, its installed state corresponds to the enabled state, whereas its removed state corresponds to the stopped state. Accordingly, provided that it is possible to detect whether the print media stacking means is installed or removed, the object of the present invention can be accomplished by transmitting media information based on the result of the detection to the information processing apparatus.

Furthermore, by providing the print media stacking means with a paper type detecting means for detecting the size or material of print media, it is possible to transmit more detailed and reliable information on the print media stacked in the print media stacking means to the information processing apparatus. This further improves the reliability of the system.

The present invention has been described in detail with respect to preferred embodiments, and it will now be apparent from the foregoing to those skilled in the art that changes and modifications may be made without departing from the invention in its broader aspects, and it is the intention, therefore, that the appended claims cover all such changes and modifications as fall within the true spirit of the invention.

This application claims priority from Japanese Patent Application No. 2003-314810 filed Sep. 5, 2003, which is hereby incorporated by reference herein.

The invention claimed is:

1. A printing apparatus that enables transmission of information between a printing apparatus main body that performs a printing operation on print media and a predetermined information processing apparatus, the printing apparatus comprising:

a first print media supplying section;

a second print media supplying section on which print media of a different size from a size of print media supplied from said first print media supplying section can be stacked, said second print media supplying section being removably installed in said first print media supplying section;

a paper feeding unit commonly used for supplying both of the print media stacked on said first print media section and the print media stacked on said second print media section;

a first sensor which determines whether or not said second print media supplying section is installed in said first print media supplying section;

a second sensor which determines whether or not said second print media supplying section can supply the print media;

storage means for storing media information of the print media stacked in said first and second print supplying sections;

determining means for determining the print media which can be supplied in accordance with outputs of said first and second sensors; and communication means for transmitting the media information to said information processing apparatus after having read the media information out of said storage means, the media information corresponding to the print media determined by said determining means.

2. The printing apparatus according to claim 1, wherein said communication means transmits the media information of the print media stacked on said second print media supplying section when said first sensor determines that said second print media supplying section is installed in said first print media supplying section and said second sensor determines that said second print media supply section can supply the print media.

3. The printing apparatus according to claim 1, wherein said communication means transmits the media information of the print media stacked on said first print media supplying section when said first sensor determines that said second print media supplying section is not installed in said first print media supplying section.

4. The printing apparatus according to claim 1, wherein said storage means stores print media table information comprised of information including media information on the size of print media that can be stacked in said first and second print media supplying sections, and wherein said communication means transmits the media table information as communication information.

5. The printing apparatus according to claim 4, wherein the print media table information includes information indicative of the sizes and materials of print media and image correction parameters.

6. The printing apparatus according to claim 1, wherein said communication means includes at least a Universal Serial Bus (USB) interface.

7. The printing apparatus according to claim 1, further comprising comparison means for comparing the media information of the print media stacked on said second print media supplying section and the media information of the print media stored in said storage means, wherein when said second sensor determines a change of a state of said second print media supplying section, the media information stored in said storage means is rewritten.

* * * * *

UNITED STATES PATENT AND TRADEMARK OFFICE

CERTIFICATE OF CORRECTION

PATENT NO. : 7,056,046 B2
APPLICATION NO. : 10/929527
DATED : June 6, 2006
INVENTOR(S) : Yamazaki It is certified that error appears in the above-identified patent and that said Letters Patent is hereby corrected as shown below:

TITLE PAGE [57] ABSTRACT:
Line 6, "supply" should read --supplying--.
Line 12, "section" should read --second--.

COLUMN 5:
Line 45, "hereinafter referred" should read --hereinafter be referred--.

COLUMN 9:
Line 11, "steps 5711" should read --steps S711--.

COLUMN 11:
Line 12, "media section" should read --media supplying section--.
Line 14, "section;" should read --supplying section;--.

COLUMN 12:
Line 3, "supply" (first occurrence) should read --supplying--.

Signed and Sealed this

Second Day of September, 2008

JON W. DUDAS
*Director of the United States Patent and Trademark Office*